(12) United States Patent
Hou

(10) Patent No.: US 12,730,335 B2
(45) Date of Patent: Sep. 8, 2026

(54) INTERCHANGEABLE DECORATIVE ACCESSORY DEVICE FOR SPECTACLE TEMPLE

(71) Applicant: TEAMWORKS GLASSES CORP., Tainan (TW)

(72) Inventor: Mei-Yueh Hou, Tainan (TW)

(73) Assignee: TEAMWORKS GLASSES CORP., Tainan (TW)

( * ) Notice: Subject to any disclaimer, the term of this patent is extended or adjusted under 35 U.S.C. 154(b) by 224 days.

(21) Appl. No.: 18/784,954

(22) Filed: Jul. 26, 2024

(65) Prior Publication Data

US 2026/0029666 A1 Jan. 29, 2026

(51) Int. Cl.
*G02C 11/02* (2006.01)
*G02C 5/14* (2006.01)

(52) U.S. Cl.
CPC .............. *G02C 11/02* (2013.01); *G02C 5/146* (2013.01); *G02C 2200/02* (2013.01); *G02C 2200/08* (2013.01)

(58) Field of Classification Search
CPC .... G02C 11/02; G02C 5/146; G02C 2200/02; G02C 2200/08
USPC .............................................. 351/41, 51, 52
See application file for complete search history.

(56) References Cited

U.S. PATENT DOCUMENTS

2012/0075571 A1* 3/2012 Silver .................... G02C 11/02 351/52

* cited by examiner

*Primary Examiner* — Tuyen Tra

(57) ABSTRACT

The present invention provides an interchangeable decorative accessory device for spectacle temple, including a frame, two temples, and two decorative accessories, respectively provided thereon. A front section of each of the temples is a decorative assembly part, and a slide groove is provided on the wall surface thereof. The two decorative accessories each has a retaining edge protruding inwardly at the front end thereof. The decorative accessories each has a groove provided on the inner surface of the front end thereof, and a magnet fixed in the groove, wherein the magnet is magnetically attracted to the outer surface of the decorative assembly part of the temple. The decorative accessories each has a protruding strip provided on the inner surface thereof, and arranged into the sliding groove of the temple. The protruding strip has an embedded groove, each disposed oppositely on an upper edge and a lower edge thereof.

2 Claims, 5 Drawing Sheets

3
20
24
33
34

INTERCHANGEABLE DECORATIVE ACCESSORY DEVICE FOR SPECTACLE TEMPLE

BACKGROUND OF THE PRESENT INVENTION

Field of Invention

The present invention relates to an interchangeable decorative accessory device for spectacle temple.

Description of Related Arts

Generally, spectacles mainly consist of a frame and two temples. The frame has two pivot connection parts provided at two ends thereof. The temples each have a pivot lug arranged on the front end thereof. The temples are pivotally connected to the frame through pivot elements. However, most of the temples are made of one-piece molding of metal or plastic materials, which is more monotonous and unchanged in the presentation of the temples.

SUMMARY OF THE PRESENT INVENTION

The main purpose of the present invention is to provide an interchangeable decorative accessory device for spectacle temple that can facilitate the replacement of decorative accessories on the temples by oneself.

An interchangeable decorative accessory device for spectacle temple of the present invention includes a frame, two temples, and two decorative accessories, respectively provided thereon, wherein the frame has a pivot connection part provided on each of two ends thereof, wherein the pivot connection part has a pivot member disposed thereon, wherein the two temples are respectively pivoted on the pivot connection parts at the two ends of the frame through the pivot members, wherein a front section of each of the temples is a decorative assembly part made of metal material, wherein the decorative assembly part has a pivot lug disposed on the inner surface of the front end portion thereof, wherein the pivot lug is pivoted on the pivot connection part of the frame through the pivot member, wherein the decorative assembly part has a bending part located behind the pivot lug, and a slide groove provided on the wall surface of the decorative assembly part, wherein the slide groove extends to the bending part, wherein the two decorative accessories are respectively assembled on the outer surfaces of the decorative assembly parts of the two temples, wherein the two decorative accessories each has a retaining edge protruding inwardly at the front end thereof, wherein the retaining edge abuts against a front edge of the temple, wherein the decorative accessories each has a groove provided on the inner surface of the front end thereof, and a magnet fixed in the groove, wherein the magnet is magnetically attracted to the outer surface of the decorative assembly part of the temple, wherein the decorative accessories each has a protruding strip provided on the inner surface thereof, and arranged into the sliding groove of the temple, wherein the protruding strip has an embedded groove, each disposed oppositely on an upper edge and a lower edge thereof, wherein the embedding groove is used to insert the upper and lower edges of the sliding groove of the temple.

The present invention provides an interchangeable decorative accessory device for spectacle temple, wherein the decorative accessories are made of plastic material.

The advantage of the interchangeable decorative accessory device for spectacle temple of the present invention is that the user can replace different decorative accessories on the temples according to the needs, so that the appearance of the temples is more variable, and the replacement of decorative accessories is convenient and fast.

DETAILED DESCRIPTION OF THE PREFERRED EMBODIMENT

Figure 1:
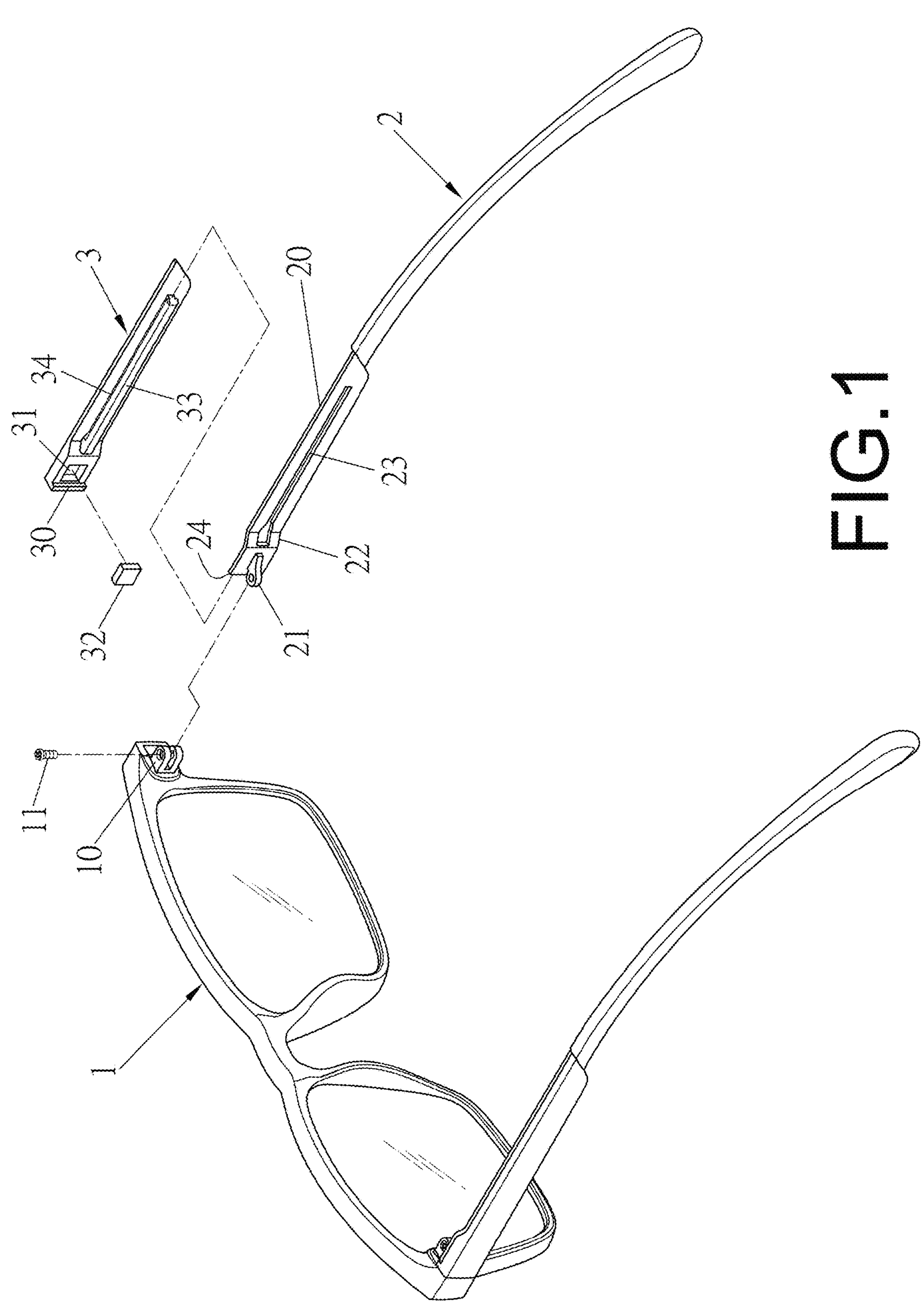
FIG. 1 illustrates an exploded view according to an embodiment of the present invention.
Figure 2:
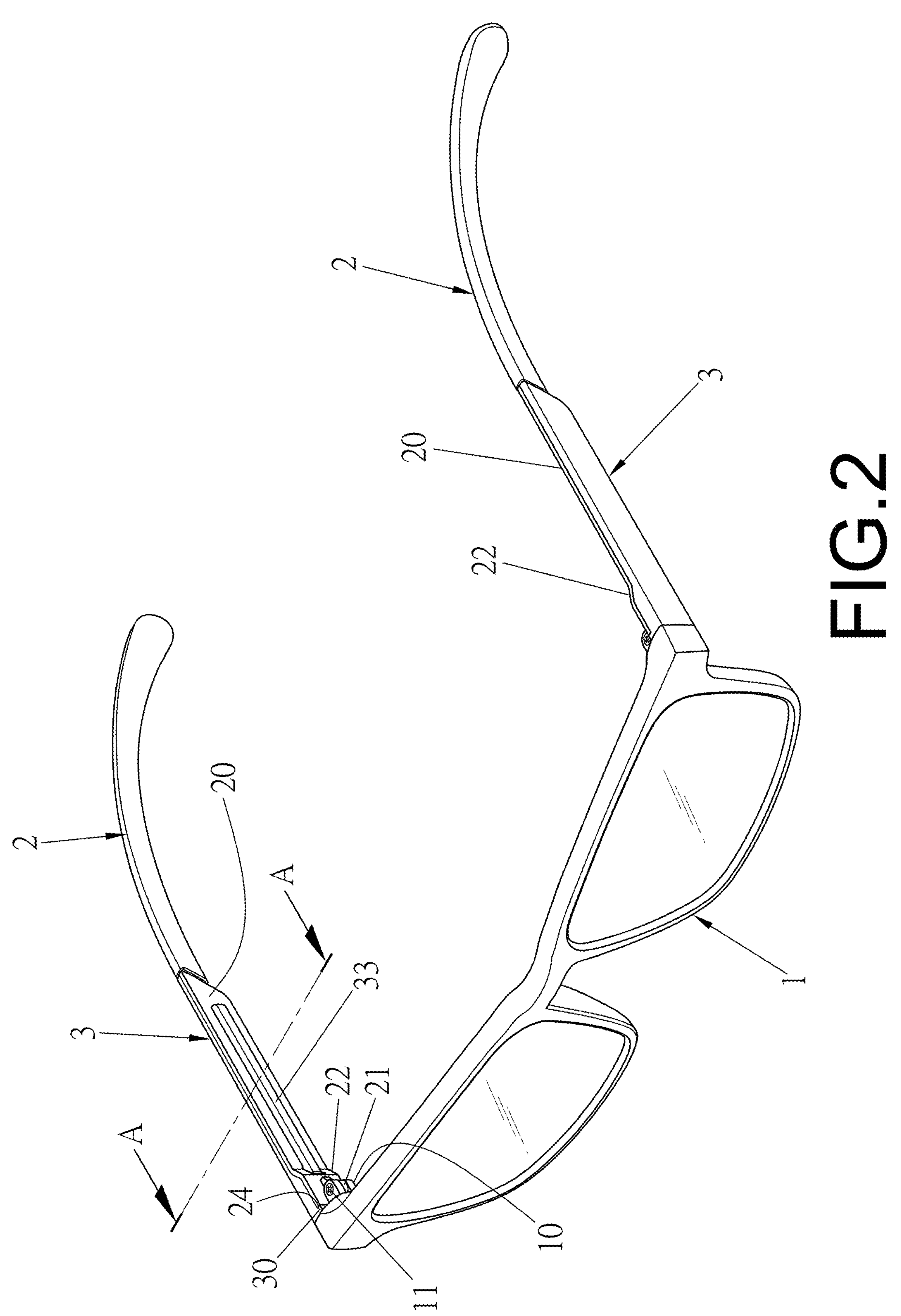
FIG. 2 illustrates a perspective view according to an embodiment of the present invention.
Figure 3:
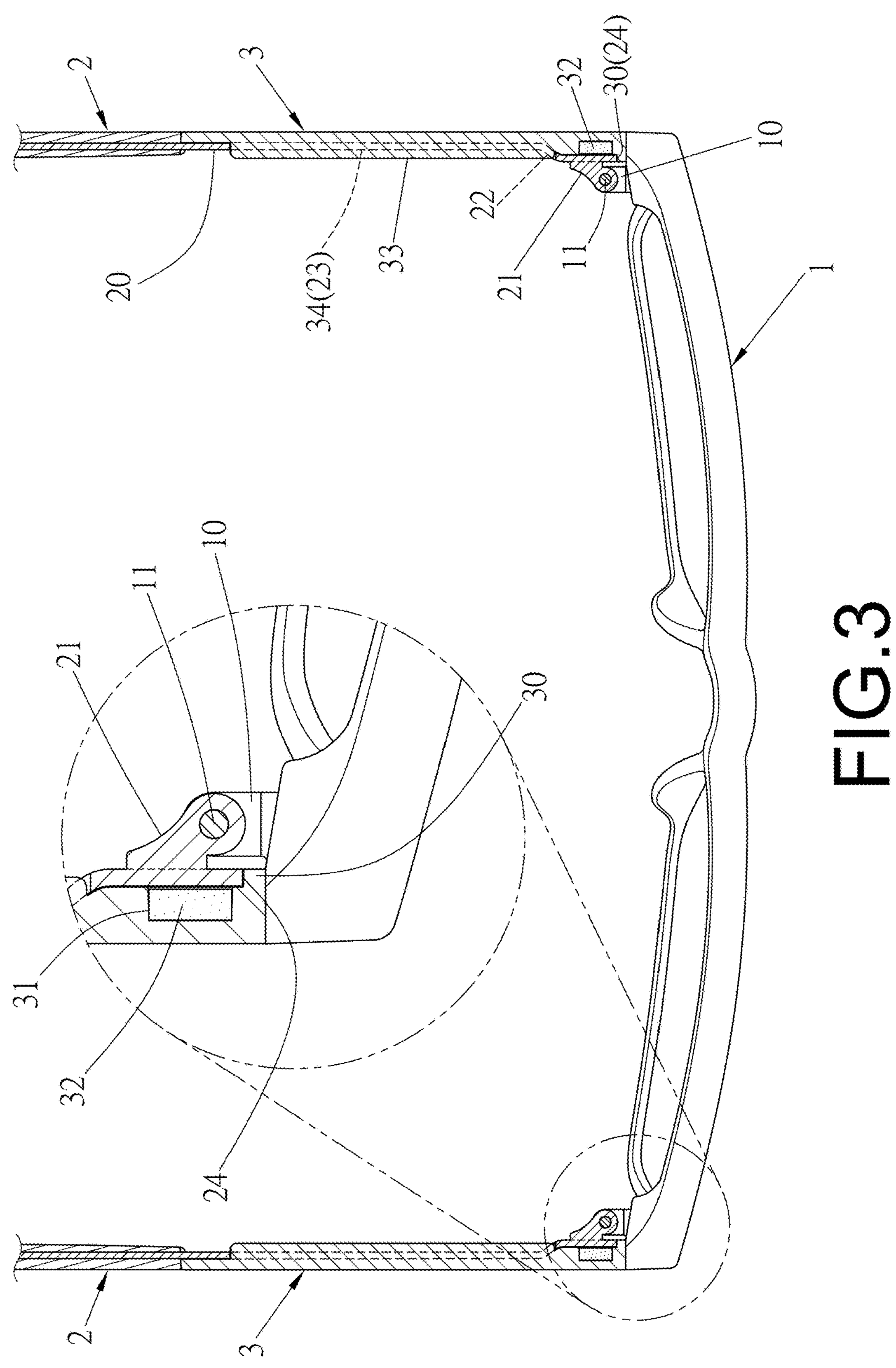
FIG. 3 illustrates an assembled sectional view according to an embodiment of the present invention.
Figure 4:
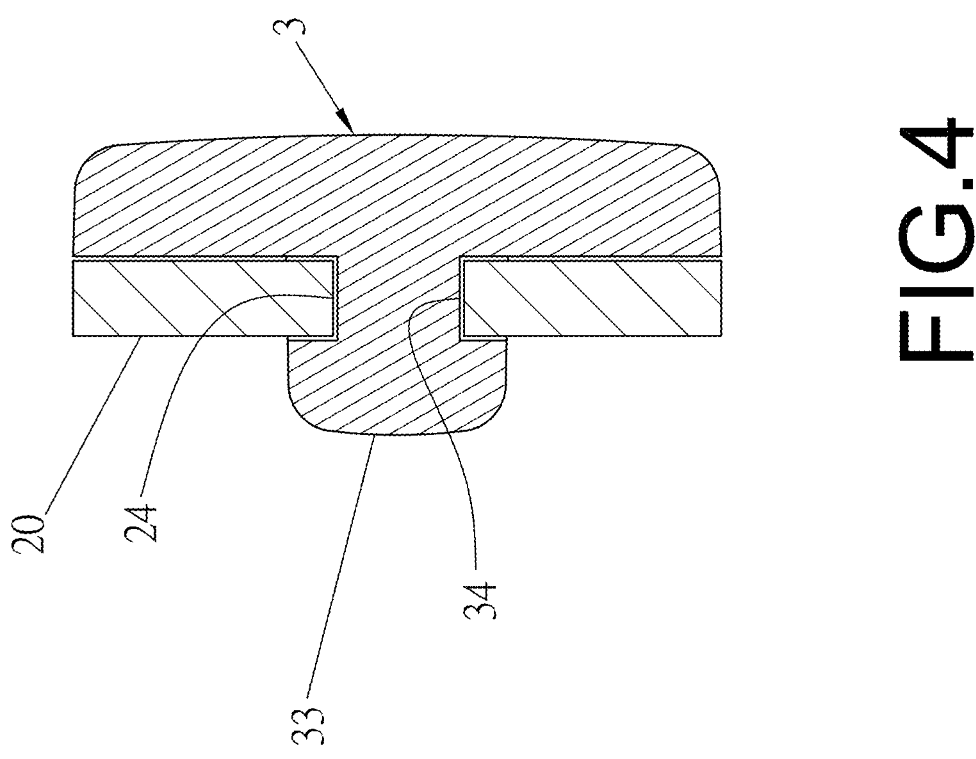
FIG. 4 illustrates a sectional view of A-A in FIG. 2.

Regarding the technical means adopted by the present invention to achieve the above-mentioned purposes and effects, the best and feasible embodiments are enumerated and shown in the drawings, and are described in detail as follows:

For an embodiment of the present invention, referring to FIGS. 1 to 4. A interchangeable decorative accessory device for spectacle temple includes a frame 1, two temples 2, and two decorative accessories 3, respectively provided thereon, wherein the frame 1 has a pivot connection part 10 provided on each of two ends thereof, wherein the pivot connection part 10 has a pivot member 11 disposed thereon, wherein the two temples 2 are respectively pivoted on the pivot connection parts 10 at the two ends of the frame 1 through the pivot members 11. A front section of each of the temples 2 is a decorative assembly part 20 made of metal material. The decorative assembly part 20 has a pivot lug 21 disposed on the inner surface of the front end portion thereof, wherein the pivot lug 21 is pivoted on the pivot connection part 10 of the frame 1 through the pivot member 11. The decorative assembly part 20 has a bending part 22 located behind the pivot lug 21, and a slide groove 23 provided on the wall surface of the decorative assembly part 20, wherein the slide groove 23 extends to the bending part 22. The two decorative accessories 3 are respectively assembled on the outer surfaces of the decorative assembly parts 20 of the two temples 2. The decorative accessories 3 are made of plastic material, and the decorative accessories 3 are allowed to be of different colors, or the decorative accessories 3 are provided with patterns, and other different decorations. The two decorative accessories 3 each has a retaining edge 30 protruding inwardly at the front end thereof. The retaining edge 30 abuts against a front edge 24 of the temple 2. The decorative accessories 3 each has a groove 31 provided on the inner surface of the front end thereof, and a magnet 32 fixed in the groove 31. The magnet 32 is magnetically attracted to the outer surface of the decorative assembly part 20 of the temple. The decorative accessories 3 each has a protruding strip 33 provided on an inner surface thereof, and arranged into the sliding groove 23 of the temple 2. The protruding strip 33 has an embedded groove 34, each disposed oppositely on an upper edge and a lower edge thereof. The embedding groove 34 is used to insert the upper and lower edges of the sliding groove 23 of the temple 2. In this way, a interchangeable decorative accessory device for spectacle temple is formed.

Figure 5:
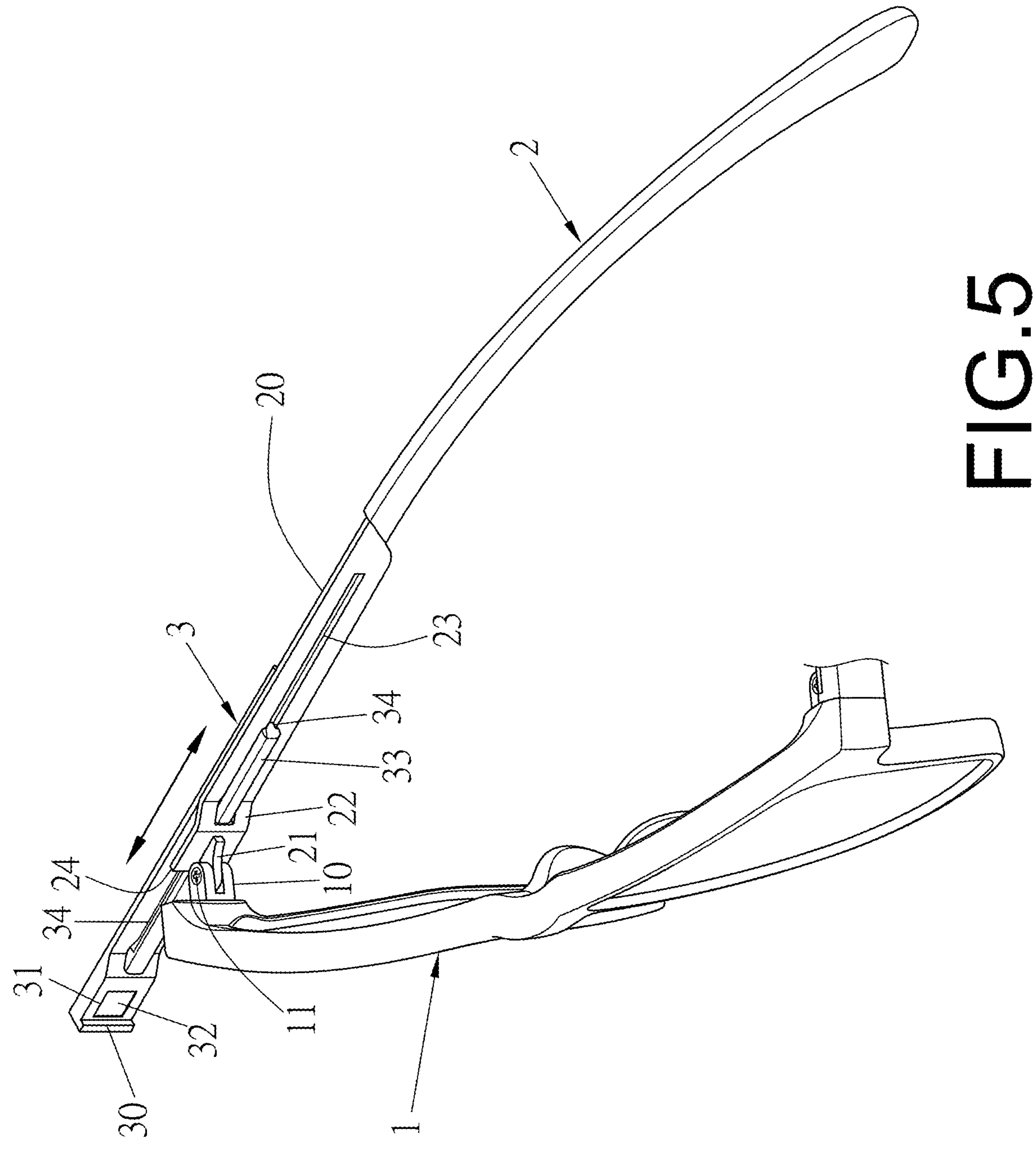
FIG. 5 illustrates a perspective view of replacement of decorative accessory according to an embodiment of the present invention.

When the present invention is assembled and used, referring to FIGS. 1 to 5. First, place the inner surface of the rear end of the decorative accessory 3 against the outer surface of the front end of the temple 2, and insert the protruding strip 33 on the inner surface of the decorative accessory 3 from the slide groove 23 of the bending part 22 of the temple 2, and set the upper and lower edges of the slide groove 23 of the temple 2 into the embedded groove 34 of the upper and lower edges of the protruding strip 33, and then push the decorative accessory 3 toward the rear of the temple 2, and slide the protruding strip 33 of the decorative accessory 3 on the slide groove 23 of the temple 2 until the retaining edge 30 of the decorative accessory 3 blocks the front edge 24 of the temple 2. Then, magnetically position the decorative accessory 3 on the outer surface of the decorative assembly part 20 of the temple 2 through the magnet 32 provided on the inner surface, so that the decorative accessory 3 can be assembled and positioned on the temple 2. Then, respectively pivoted, the two temples 2 on the two pivot connection parts 10 of the frame 1 through the pivot members 11. In this way, the assembly of the temples 2 and the frame 1 can be completed. Through the arrangement of the decorative accessories 3 on the temples 2, the overall decorative effect of the temples 2 can be increased, making the spectacle more beautiful to wear. Referring to FIG. 5, when the decorative accessory 3 on the temple 2 is to be replaced, the user only needs to fold and close the temple 2 from the frame 1, the temple 2 takes the pivot member 11 as the pivot axis, the front ends of the temple 2 and the decorative accessory 3 are rotated away from the frame 1, the front end of the decorative accessory 3 is no longer blocked by the frame 1, and the decorative accessory 3 can be pushed forward and moved out on the temple 2, and the protruding strip 33 of the decorative accessory 3 slides on the slide groove 23 of the temple 2 and slides out from the bending part 22 of the temple 2, so that the decorative accessory 3 can be separated from the temple 2, and the decorative assembly part 20 of the temple 2 can be replaced with another desired decorative accessory 3. The decorative accessories 3 are very convenient and fast to assemble and disassemble. The user can replace different decorative accessories 3 on the temples 2 according to needs, so that the presentation of the temples 2 more diverse.

In summary, the present invention has achieved the expected objects and effects, and is more ideal and practical than prior art. However, the above-mentioned embodiments are only for specifically describing the preferred embodiments of the present invention, and the embodiments are not intended to limit the scope of the present application. Also, other equivalent changes and modifications made without departing from the technical means disclosed in the present invention are intended to be included in the patent scope of the present invention.

What is claimed is:

1. An interchangeable decorative accessory device for spectacle temple, comprising a frame, two temples, and two decorative accessories, respectively provided thereon, wherein the frame has a pivot connection part provided on each of two ends thereof, wherein the pivot connection part has a pivot member disposed thereon, wherein the two temples are respectively pivoted on the pivot connection parts at the two ends of the frame through the pivot members, wherein a front section of each of the temples is a decorative assembly part made of metal material, wherein the decorative assembly part has a pivot lug disposed on the inner surface of the front end portion thereof, wherein the pivot lug is pivoted on the pivot connection part of the frame through the pivot member, wherein the decorative assembly part has a bending part located behind the pivot lug, and a slide groove provided on the wall surface of the decorative assembly part, wherein the slide groove extends to the bending part, wherein the two decorative accessories are respectively assembled on the outer surfaces of the decorative assembly parts of the two temples, wherein the two decorative accessories each has a retaining edge protruding inwardly at the front end thereof, wherein the retaining edge abuts against a front edge of the temple, wherein the decorative accessories each has a groove provided on the inner surface of the front end thereof, and a magnet fixed in the groove, wherein the magnet is magnetically attracted to the outer surface of the decorative assembly part of the temple, wherein the decorative accessories each has a protruding strip provided on the inner surface thereof, and arranged into the sliding groove of the temple, wherein the protruding strip has an embedded groove, each disposed oppositely on an upper edge and a lower edge thereof, wherein the embedding groove is used to insert the upper and lower edges of the sliding groove of the temple.

2. The interchangeable decorative accessory device for spectacle temple, as recited in claim 1, wherein the decorative accessories are made of plastic material.

* * * * *